(12) United States Patent
Yang et al.

(10) Patent No.: US 10,007,031 B2
(45) Date of Patent: Jun. 26, 2018

(54) MOBILE EQUIPMENT PROTECTIVE SLEEVE, MOBILE EQUIPMENT

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Jiantao Liu, Beijing (CN); Hongbo Feng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 219 days.

(21) Appl. No.: 15/086,853

(22) Filed: Mar. 31, 2016

(65) Prior Publication Data

US 2017/0023706 A1    Jan. 26, 2017

(30) Foreign Application Priority Data

Jul. 20, 2015   (CN) .......................... 2015 1 0426679

(51) Int. Cl.
*G02B 1/14* (2015.01)
*A45C 11/00* (2006.01)
*G02B 27/22* (2018.01)
*G06F 1/16* (2006.01)
*H04B 1/3888* (2015.01)

(52) U.S. Cl.
CPC ................ *G02B 1/14* (2015.01); *A45C 11/00* (2013.01); *G02B 27/2214* (2013.01); *G06F 1/1628* (2013.01); *H04B 1/3888* (2013.01); *A45C 2011/002* (2013.01); *A45C 2011/003* (2013.01)

(58) Field of Classification Search
CPC ..... G02B 1/14; A45C 11/00; A45C 2011/002; A45C 2011/003
See application file for complete search history.

(56) References Cited

U.S. PATENT DOCUMENTS

| | | | |
|---|---|---|---|
| 2012/0261306 A1* | 10/2012 | Richardson | G06F 1/1626 206/778 |
| 2014/0153091 A1* | 6/2014 | Boudreau | G02B 27/2214 359/463 |
| 2015/0000884 A1* | 1/2015 | Jiang | A45C 11/00 165/185 |

* cited by examiner

*Primary Examiner* — Karuna P Reddy
(74) *Attorney, Agent, or Firm* — Harness, Dickey & Pierce, P.L.C.

(57) ABSTRACT

The invention provides a mobile equipment protective sleeve and a mobile equipment. The mobile equipment protective sleeve comprises: a bottom plate and a protective cover plate that is connected with and set opposite to the bottom plate, and a lenticular lens or a slit grating is located at a display region of the protective cover plate; the mobile equipment protective sleeve is made of a resin composition containing a functional material, or a surface of the mobile equipment protective sleeve is coated with a functional material. The functional material is an inorganic powder with an organic modification layer on a surface thereof, and the modification layer is generated by reacting a dianhydride with a diamine.

20 Claims, 2 Drawing Sheets

MOBILE EQUIPMENT PROTECTIVE SLEEVE, MOBILE EQUIPMENT

CROSS-REFERENCE TO RELATED APPLICATION

The present application claims priority to and incorporates by reference the entire contents of Chinese priority document 201510426679.5, filed in China on Jul. 20, 2015.

TECHNICAL FIELD

The present invention relates to the field of protective sleeves, and in particular, to a mobile equipment protective sleeve and a mobile equipment.

BACKGROUND

Mobile equipments, including mobile communication equipments and mobile navigation products, etc., are popular among people due to the characteristics of easy carrying, abundant functions, strong entertainment and the like.

Generally, the main structure of an existing mobile equipment is a 2D display device. Because of the planar limitation of 2D display, the requirement on the cubic effect of a picture cannot be met with each passing day. At present, researchers tend to develop 3D-display mobile equipment that has a stereo and vivid picture effect.

3D display technology is divided into glasses stereo display and naked-eye stereo display. For easy and convenient use, naked-eye stereo display technology has more competitive power in conjunction with mobile equipment. At present, in a mobile equipment that can realize naked-eye 3D display, a grating or a lens is usually designed inside the display device. Therefore, if it wants to realize the free switching between 2D and 3D display, at least 2 layers of display units must be designed on the back of the display device of the mobile equipment. However, in the prior art, when a 3D display unit is added inside a display device, the structure of the display device itself will be thick, and at the same time, the cost will be increased. Moreover, the display device itself will inevitably generate some electromagnetic radiation, which has an adverse effect on human health.

On the other hand, the screen of a mobile equipment is bigger and bigger, thus the contact region between the display screen and the outside will be increased correspondingly, and the risk of damage of the display screen caused thereby will be increased. Therefore, at present, a user usually adds a protective sleeve to a mobile equipment when it is used. The existing protective sleeve only has a protective function, and the performance is singular.

The present inventors hope to design a multifunctional mobile equipment protective sleeve and combine the mobile equipment protective sleeve and a 3D display function. The mobile equipment protective sleeve may be used in conjunction with a display device, thus the switching between 2D and 3D display effects may be realized, and it also has a certain healthcare efficacy.

SUMMARY

It is an object of the present invention to provide a mobile equipment protective sleeve, which may used in conjunction with a display device, thereby the switching between 2D and 3D display effects may be realized, and it also has a healthcare efficacy.

The invention discloses a mobile equipment protective sleeve, which includes a bottom plate and a protective cover plate that is connected with and set opposite to the bottom plate, and a lenticular lens or a slit grating is located at a display region of the protective cover plate;

The mobile equipment protective sleeve is made of a resin composition containing a functional material, or a surface of the mobile equipment protective sleeve is coated with a functional material;

The functional material is an inorganic powder with an organic modification layer on a surface thereof;

The inorganic powder is one or more of boron oxide, sodium oxide, lithium oxide, aluminium oxide, zinc oxide, titanium oxide, silicon dioxide, silver complex, silver phosphate, silver nitrate, zirconium oxide, nano or sub-nano tourmaline, silver thiosulfate, carbon nanotube, aluminium sulphate, manganese and oxides thereof, iron and oxides thereof, cobalt and oxides thereof, nickel and oxides thereof, chromium and oxides thereof, copper and oxides thereof, magnesium oxide, boron carbide, silicon carbide, titanium carbide, zirconium carbide, tungsten carbide, tantlum carbide, molybdenum carbide, boron nitride, chromium nitride, titanium nitride, zirconium nitride, aluminium nitride, chromium boride, trichromium tetraboride, titanium boride, zirconium boride, tungsten disilicide and titanium disilicide;

The modification layer is generated by reacting a dianhydride with a diamine.

Optionally, the dianhydride of the modification layer is pyromellitic dianhydride, trimellitic anhydride, benzophenone dianhydride, biphenyl dianhydride, oxydiphthalic dianhydride or hexafluoro dianhydride;

The diamine of the modification layer is 3-aminobenzylamine, 2,2'-difluoro-4,4'-(9-fluorenylidene)diphenylamine, 2,2-bis(3-amino-4-hydroxyphenyl)hexafluoropropane, hexahydro-m-xylylenediamine, 1,4-bi(aminomethyl)cyclohexane, 2,2-bis[4-(4-aminophenoxy)benzene]hexafluoropropane, 2,2-bis(3-amino-4-tolyl)hexafluoropropane, 2,2-bis(3-aminophenyl)hexafluoropropane, 2,2-bis(4-aminophenyl)hexafluoropropane, 2,7-diaminofluorene, m-xylylenediamine or 4,4'-methylenebis(2-ethyl-6-methylaniline).

Optionally, a method for preparing the functional material includes:

mixing the inorganic powder, the dianhydride, the diamine, an initiator and a solvent, heating and reacting, thus obtaining the functional material.

Optionally, the heated reaction specifically includes:

heating at 35-70° C. for 20-40 minutes; and then, heating at 70-100° C. for 20-40 minutes.

Optionally, the functional material is set on an inner surface or an outer surface of the lenticular lens or the slit grating.

Optionally, a lenticular lens or a slit grating is located on the outer surface of the display region of the protective cover plate.

Optionally, a convex face of the lenticular lens is set on a side that does not contact the protective cover plate.

Optionally, a restricting slot is set at a joint between the protective cover plate and the bottom plate.

Optionally, the display region of the protective cover plate is made of glass or optical plastic.

Optionally, the mobile equipment protective sleeve further includes a solar film set on the outer surface of the bottom plate.

One embodiment of the invention further discloses a mobile equipment, which includes the above mobile equipment protective sleeve.

In comparison with the prior art, the mobile equipment protective sleeve of the invention includes a bottom plate and a protective cover plate that is connected with and set opposite to the bottom plate, and a lenticular lens or a slit grating is located at a display region of the protective cover plate; the mobile equipment protective sleeve is made of a resin composition containing a functional material, or a surface of the mobile equipment protective sleeve is coated with a functional material. The functional material can emit far-infrared rays and negative ions; the heat energy of the far-infrared ray may be transferred deep into a subcutaneous part, so that the underlayer temperature will rise, and the blood capillaries will be expanded, thus blood circulation will be accelerated, the tissue regeneration ability will be strengthened, and body immunity will be improved; negative ions have the effect of bactericin and air refinement. Therefore, the mobile equipment protective sleeve with the functional material has a medical care function. Moreover, a lenticular lens or a slit grating is further located on the protective cover plate of the protective sleeve according to the invention, and because both of them can make a user have binocular disparity and thereby have stereo vision, when it is applied to a display device, the user may see a 3D-display pattern through the lens or the grating; after the protective cover plate is removed, the user may see a normal 2D-display pattern, so that free switching between 2D and 3D display may be realized.

DETAILED DESCRIPTION

Figure 1:
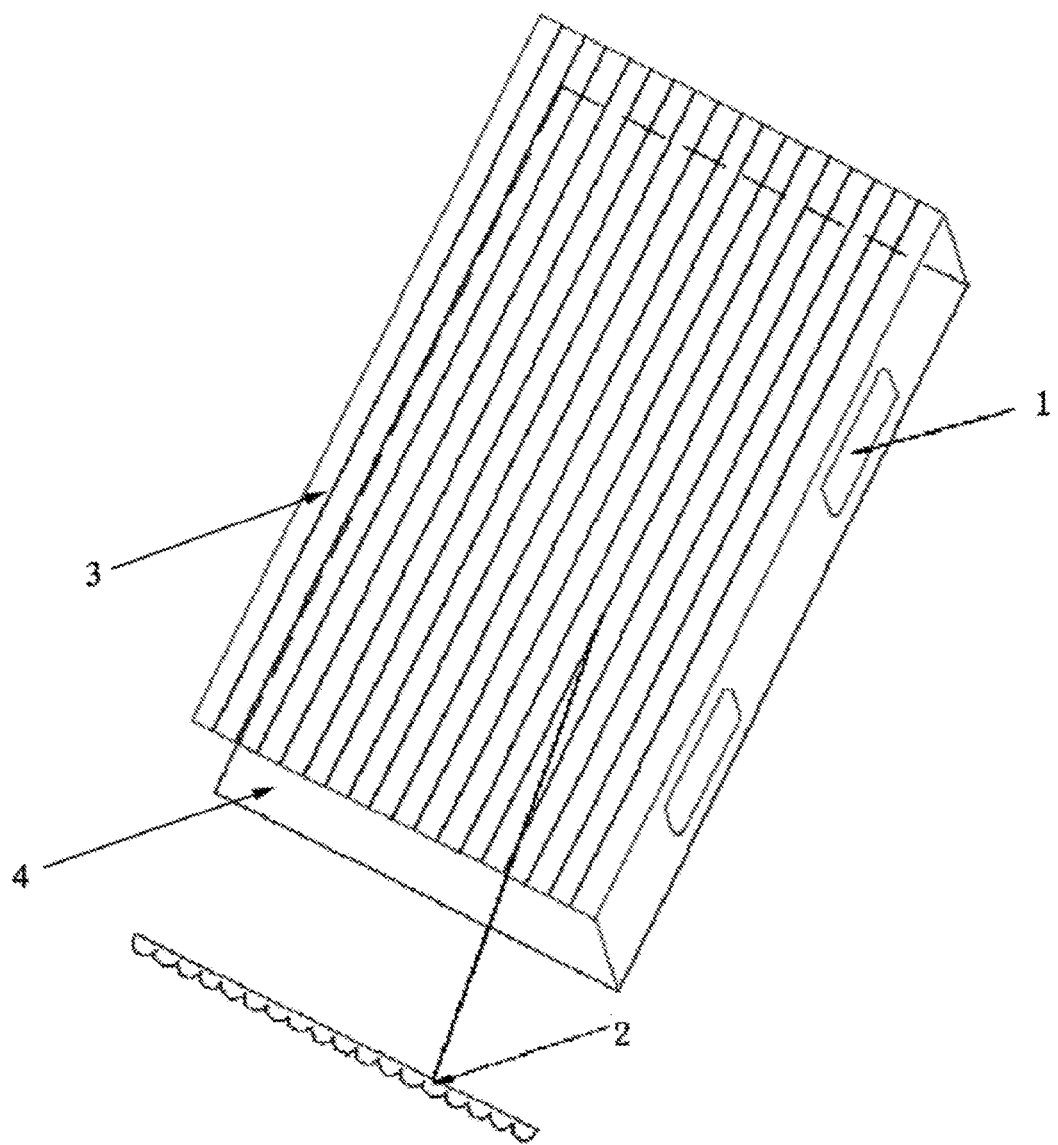
FIG. 1 is a structural representation of a mobile equipment protective sleeve according to Embodiment 1 of the invention.

For further understanding the invention, the implementation of the invention will be describe below in conjunction with the embodiments. However, it should be understood that, these descriptions are only used for illustrating the characteristics and advantages of the invention, rather than limiting the claims of the invention.

One embodiment of the invention discloses a mobile equipment protective sleeve, which includes a bottom plate and a protective cover plate that is connected with and set opposite to the bottom plate, and a lenticular lens or a slit grating is located at a display region of the protective cover plate;

The mobile equipment protective sleeve is made of a resin composition containing a functional material, or a surface of the mobile equipment protective sleeve is coated with a functional material;

The functional material is an inorganic powder with an organic modification layer on a surface thereof;

The inorganic powder is one or more of boron oxide, sodium oxide, lithium oxide, aluminium oxide, zinc oxide, titanium oxide, silicon dioxide, silver complex, silver phosphate, silver nitrate, zirconium oxide, nano or sub-nano tourmaline, silver thiosulfate, carbon nanotube, aluminium sulphate, manganese and oxides thereof, iron and oxides thereof, cobalt and oxides thereof, nickel and oxides thereof, chromium and oxides thereof, copper and oxides thereof, magnesium oxide, boron carbide, silicon carbide, titanium carbide, zirconium carbide, tungsten carbide, tantlum carbide, molybdenum carbide, boron nitride, chromium nitride, titanium nitride, zirconium nitride, aluminium nitride, chromium boride, trichromium tetraboride, titanium boride, zirconium boride, tungsten disilicide and titanium disilicide;

The modification layer is generated by reacting a dianhydride with a diamine.

In the embodiment of the invention, the mobile equipment protective sleeve includes a bottom plate and a protective cover plate that is connected with and set opposite to the bottom plate. The protective cover plate has a display region, and the area of the display region may be consistent with the area of the bottom plate, or it may be less than the area of the bottom plate.

The mobile equipment protective sleeve is made of a resin composition containing a functional material, that is, the functional material is doped in the resin material for preparing the protective sleeve, or a surface of the mobile equipment protective sleeve is coated with a functional material, for example, a surface of the bottom plate or a surface of the protective cover plate is coated with a functional material. The surface may be an outer surface or an inner surface, and it may be completely coated or partially coated. In the case that the functional material is doped in the resin material for preparing the protective sleeve, the addition level is 1-3 wt % of the mass of the resin material. In the case that the functional material is coated on the surface of the protective sleeve, the functional material may be dissolved in an organic solvent first to obtain a solution with a solid content of 2-5 wt %, and then it is coated. The organic solvent for dissolving the functional material may be selected from: a basic solvent, such as ketone, ester, ether and some aromatic hydrocarbon solvents; a neutral solvent, such as aliphatic hydrocarbon and naphthenic hydrocarbon compound, and some aromatic hydrocarbon solvents, etc. Specifically, for example, the organic solvent may be fatty alcohol, glycol ether, ethyl acetate, methylethylketone, methyl isobutyl ketone, monomethyl ether glycol ester, γ-butyrolactone, ethyl propionate-3-ether, butyl carbitol, butyl carbitol acetate, propylene glycol monomethyl ether, propylene glycol monomethyl etheracetate (PGMEA), cyclohexane, xylene or isopropyl alcohol. Moreover, for example, the organic solvent may be isopropylene glycol monomethyl ether, propylene glycol monomethyl ether acetate, cyclohexane, butyl carbitol, butyl carbitol acetate or γ-butyrolactone.

The functional material is an inorganic powder with an organic modification layer on a surface thereof. The inorganic powder in the functional material has the function of emitting infrared rays and negative ions. Because it is difficult to be homogeneously mixed with an organic material, in the embodiment of the invention, it will be modified with an organic material so as to change its surface morphology and crystal boundary structure, thereby it may be well fused with other organic materials.

The inorganic powder is one or more of boron oxide, sodium oxide, lithium oxide, aluminium oxide, zinc oxide, titanium oxide, silicon dioxide, silver complex, silver phosphate, silver nitrate, zirconium oxide, nano or sub-nano tourmaline, silver thiosulfate, carbon nanotube, aluminium sulphate, manganese and oxides thereof, iron and oxides thereof, cobalt and oxides thereof, nickel and oxides thereof, chromium and oxides thereof, copper and oxides thereof, magnesium oxide, boron carbide, silicon carbide, titanium carbide, zirconium carbide, tungsten carbide, tantlum carbide, molybdenum carbide, boron nitride, chromium nitride, titanium nitride, zirconium nitride, aluminium nitride, chromium boride, trichromium tetraboride, titanium boride, zirconium boride, tungsten disilicide and titanium disilicide. The inorganic powder may emit far-infrared rays and/or negative ions. For example, aluminium oxide, magnesium oxide, silicon oxide, zinc oxide, titanium dioxide, zirconium oxide, etc., may emit far-infrared rays; and at the same time, tourmaline may emit far-infrared rays and negative ions.

The modification layer is generated by reacting a dianhydride with a diamine. For example, the mol ratio of the dianhydride and the diamine may be (0.85~1.05):1, or it may be (0.92~1.05):1. For example, the dianhydride of the modification layer may be pyromellitic dianhydride, trimellitic anhydride, benzophenone dianhydride, biphenyl dianhydride, oxydiphthalic dianhydride or hexafluoro dianhydride;

For example, the diamine of the modification layer may be 3-aminobenzylamine, 2,2'-difluoro-4,4'-(9-fluorenylidene)diphenylamine, 2,2-bis(3-amino-4-hydroxyphenyl)hexafluoropropane, hexahydro-m-xylylenediamine, 1,4-bi(aminomethyl)cyclohexane, 2,2-bis[4-(4-aminophenoxy)benzene]hexafluoropropane, 2,2-bis(3-amino-4-tolyl)hexafluoropropane, 2,2-bis(3-aminophenyl)hexafluoropropane, 2,2-bis(4-aminophenyl)hexafluoropropane, 2,7-diaminofluorene, m-xylylenediamine or 4,4'-methylenebis(2-ethyl-6-methylaniline).

The modification layer generated by reacting the above dianhydride and diamine may well improve the properties of the inorganic powder.

A method for preparing the functional material may include:

mixing the inorganic powder, the dianhydride, the diamine, an initiator and a solvent, heating and reacting, thus obtaining the functional material.

Optionally, before mixing, the inorganic powder may be ground to nano-grain size. The initiator may be an azo-type compound, for example, it may be any one of azodiisobutyronitrile, 2,2'-bisazo-(2,4-dimethylvaleronitrile), azodimethyldiisobutyrate and azodiisovaleronitrile.

A method for preparing the functional material be specifically as follows:

1) In the case that a dispersant is used, each raw material that is used for preparing the inorganic powder is respectively crushed into powder and then homogeneously mixed in a proportion, or the raw materials are homogeneously mixed in a proportion first and then crushed, thus an inorganic powder is obtained.

Wherein, a conventional dispersant, for example, BYK161 produced by Germany BYK or Solsperse32500 and Solsperse22000, etc. produced by LUBRIZOL, may be selected as the dispersant; a conventional method, for example, ballmilling and ground, etc., may be employed for crushing; and because a known method may be employed to obtain an inorganic powder, it will not again be described in detail here.

2) Then, ¼~⅓ of the total amount of the initiator and ¼~⅓ of the total amount of the diamine are dissolved in a part of the solvent for standby use. Wherein, the mass ratio of the inorganic powder to the substance generated by reacting the dianhydride with the diamine is (20~1): 1. In other words, the dosages of the dianhydride and the diamine are determined in the following mode: it is hypothesized that the dianhydride and the diamine may completely react and a resultant (in fact, a modification layer) is obtained, if the mass of the resultant is 1, then the mass of the inorganic powder will be between 1-20; such a dosage may guarantee that a modification layer with an appropriate thickness is obtained on the inorganic powder.

Wherein, the initiator is used for initiating the reaction, and it may be an azo initiator, for example, it may be any one of azodiisobutyronitrile, 2,2'-bisazo-(2,4-dimethylvaleronitrile), azodimethyldiisobutyrate and azodiisovaleronitrile.

Wherein, the solvent may be selected from conventional organic solvents such as fatty alcohol, glycol ether, ethyl acetate, methylethylketone, methyl isobutyl ketone, monomethyl ether glycol ester, γ-butyrolactone, ethyl propionate-3-ether, butyl carbitol, butyl carbitol acetate, propylene glycol monomethyl ether, propylene glycol monomethyl ether acetate, cyclohexane, xylene and isopropyl alcohol, etc.

3) The inorganic powder is added into a reaction vessel (for example, a four-necked flask), and it is stirred, shocked and shaken, etc; then, the dianhydride, the remaining solvent, the remaining initiator and the diamine are added and dissolved homogeneously.

It is heated to react, for example, it may be divided into two steps, specifically: first, it is heated at a 35-70° C. for heat 20-40 min; then, it continues to be heated at 70-100° C. for 20-40 min. During the above heating process, the dianhydride may react with the diamine, so that a modification layer may be generated on the surface of the inorganic powder; wherein, the reason for stepped heating is to prevent the reaction from being too intense.

During the reaction process, the above solution containing the initiator and the diamine is added dropwise into the four-necked flask, and the reason of adding dropwise is also to prevent the reaction from being too intense.

For the protective sleeve according to the embodiments of the invention, when a 3D image is to be displayed, it requires that the protective cover plate should be applied to the display device, thus the display region of the protective cover plate may be made of a transparent material, for example, glass or optical plastic.

A lenticular lens or a slit grating is located at the display region of the protective cover plate, and it may be located on an inner surface or on an outer surface. Optionally, a lenticular lens or a slit grating is located on the outer surface of the display region of the protective cover plate. The lenticular lens is consisted of a row of vertically arranged semicircular cylindrical lenses, and two different planar images are guided to the corresponding region of the eyes respectively by using the light refraction effect of each cylindrical lens, so that the left-eye image is focused on the left eye of the viewer, and the right-eye image is focused on the right eye of the viewer, thereby a stereo vision is generated. Optionally, a convex face of the lenticular lens is set on a side that does not contact the protective cover plate, and the flat face of the lenticular lens contacts the protective cover plate.

The slit grating is consisted of transparent light-shading strips and light-transmitting strips that are set alternately. When a slit grating is located at the display region of the protective cover plate, it is applied to the display device, and because the light-shading strips block a part of the display screen, light beams of all pixels at the left viewpoint all radiate into the left-eye view, and light beams of all pixels at the right viewpoint all radiate into the right-eye view, thereby a stereo vision is generated.

In the invention, the method for forming the lenticular lens or the slit grating is not particularly limited, and a method typically used by one skilled in the art may be employed.

In the use of the mobile equipment protective sleeve according to the embodiment of the invention, the relative positions of the display device and the protective cover plate need to be adjusted such that the pixels of the display device correspond to the 3D display structure on the protective sleeve. For a protective sleeve that is set with a lenticular lens, the image plane of the display screen of the display device should be located on the focal plane of the lens. In order to ensure the relative positions of the display device and the protective cover plate, a restricting slot is set at a joint between the protective cover plate and the bottom plate, and the distance between the display device and the protective cover plate are properly fixed by the restricting slot. After the restricting slot structure is aligned and closed, the precise alignment of the pixels on the display device and the 3D display structure on the protective sleeve may be realized.

In the above technical solution, the functional material may also be set on an inner surface or an outer surface of the lenticular lens or the slit grating.

Optionally, the mobile equipment protective sleeve according to the embodiment of the invention may further include a solar film set on the outer surface of the bottom plate. The anode and the cathode on the solar film are respectively connected to lead out an electrode, which is connected to the external circuit of the battery. By using the solar film designed by the invention, the display device may be charged, thereby the range ability of the display device may be improved.

The preparation method of the mobile equipment protective sleeve according to the embodiment of the invention may further includes the following steps:

a color masterbatch and a resin are homogeneously mixed and fused, then a protective sleeve shell is obtained by pressure moulding;

a functional material is coated on an inner surface or an outer surface of the protective sleeve shell;

a mobile equipment protective sleeve set with a lenticular lens is obtained by lithographing, printing or applying a lenticular lens film at the display region of the protective cover plate of the protective sleeve shell; or, a mobile equipment protective sleeve set with a slit grating is obtained by, in turn, coating a UV material pattern layer at the display region of the protective cover plate of the protective sleeve shell, precuring, UV exposing, developing and postbaking.

The preparation method of the mobile equipment protective sleeve according to the embodiment of the invention may further includes the following steps:

A functional material, a color masterbatch and a resin are homogeneously mixed and fused, then a protective sleeve shell is obtained by pressure moulding;

a mobile equipment protective sleeve set with a lenticular lens is obtained by lithographing, printing or applying a lenticular lens film on the display region of the protective cover plate of the protective sleeve shell; or, a mobile equipment protective sleeve set with a slit grating is obtained by, in turn, coating a UV material pattern layer on the display region of the protective cover plate of the protective sleeve shell, precuring, UV exposing, developing and postbaking.

One embodiment of the invention further discloses a mobile equipment, which include the above mobile equipment protective sleeve.

For further understanding the invention, the mobile equipment protective sleeve according to the invention will be illustrated in detail below in conjunction with the embodiments, but the protection scope of the invention will not be limited to the embodiments below.

Embodiment 1

1) 5 wt % boron oxide, 2 wt % sodium oxide, 40 wt % zinc oxide, 5 wt % tungsten carbide, 40 wt % silicon oxide, 2 wt % manganese oxide and 6 wt % calcium oxide are mixed homogeneously and then crushed, thus an inorganic powder is obtained.

Then, ¼ of the total amount of azodiisobutyronitrile and ¼ of the total amount of 3-aminobenzylamine are dissolved in propylene glycol monomethyl ether acetate for standby use.

The inorganic powder is added into, for example, a four-necked flask and stirred, shocked and shaken; then, pyromellitic dianhydride, the remaining propylene glycol monomethyl ether acetate, the remaining azodiisobutyronitrile and 3-aminobenzylamine are added and dissolved homogeneously, and the mol ratio of the dianhydride to the diamine is 0.92:1.

The above mixture is first heated at 35° C. for 20 min; then, it continues to be heated at 70° C. for 20 min, thus a functional material is obtained.

2) The above functional material is dissolved in γ-butyrolactone to prepare a solution with a mass concentration of 1 wt %.

3) A color masterbatch and a resin are homogeneously mixed and fused, and then a protective sleeve shell with a restricting slot is obtained by pressure moulding;

4) The solution containing the functional material is coated on the outer surface of the protective sleeve shell; a lenticular lens film is applied to the display region of the protective cover plate of the protective sleeve shell, thus a mobile equipment protective sleeve set with a lenticular lens is obtained.

The infrared ray emissivity of the functional material obtained is tested according to GB/T7287-2008 standard, and the number of negative ions generated is measured by a air negative ion counter. The test results shows that, the infrared ray emissivity of the protective sleeve is 88%, and the negative ion concentration is 2588 per cubic centimeter.

FIG. 1 is a structural representation of a mobile equipment protective sleeve according to Embodiment 1 of the invention. In FIG. 1, 1 represents a restricting slot for assembling a display device, 2 represents a lenticular lens in the display region, 3 represents a protective cover plate, and 4 represents a bottom plate.

Embodiment 2

1) 8 wt % chromium nitride, 6 wt % magnesium oxide, 36 wt % aluminium sulphate, 5 wt % tungsten carbide, 37 wt % nano tourmaline, 2 wt % titanium carbide and 6 wt % calcium oxide are mixed homogeneously and then crushed, thus an inorganic powder is obtained.

Then, ¼ of the total amount of azodimethyldiisobutyrate and ¼ of the total amount of 2,2'-difluoro-4,4'-(9-fluorenylidene)diphenylamine are dissolved in propylene glycol monomethyl ether acetate for standby use.

The inorganic powder is added into, for example, a four-necked flask and stirred, shocked and shaken; then, trimellitic anhydride, the remaining propylene glycol monomethyl ether acetate, the remaining azodimethyldiisobutyrate and 2,2'-difluoro-4,4'-(9-fluorenylidene)diphenylamine are added and dissolved homogeneously, and the mol ratio of the dianhydride to the diamine is 1:1.

The above mixture is first heated 45° C. at for 30 min; then, it continues to be heated at 80° C. for 30 min, thus a functional material is obtained.

2) The above functional material is dissolved in ethyl acetate to prepare a solution with a mass concentration of 1 wt %.

3) A color masterbatch and a resin are homogeneously mixed and fused, and then a protective sleeve shell with a restricting slot is obtained by pressure moulding;

4) The solution containing the functional material is coated on the outer surface of the protective sleeve shell; and a mobile equipment protective sleeve set with a slit grating is obtained by, in turn, coating a UV material pattern layer on the display region of the protective cover plate of the protective sleeve shell, precuring, UV exposing, developing and postbaking.

The infrared ray emissivity of the functional material obtained is tested according to GB/T7287-2008 standard, and the number of negative ions generated is measured by a air negative ion counter. The test results shows that, the infrared ray emissivity of the protective sleeve is 90%, and the negative ion concentration is 2400 per cubic centimeter.

Figure 2:
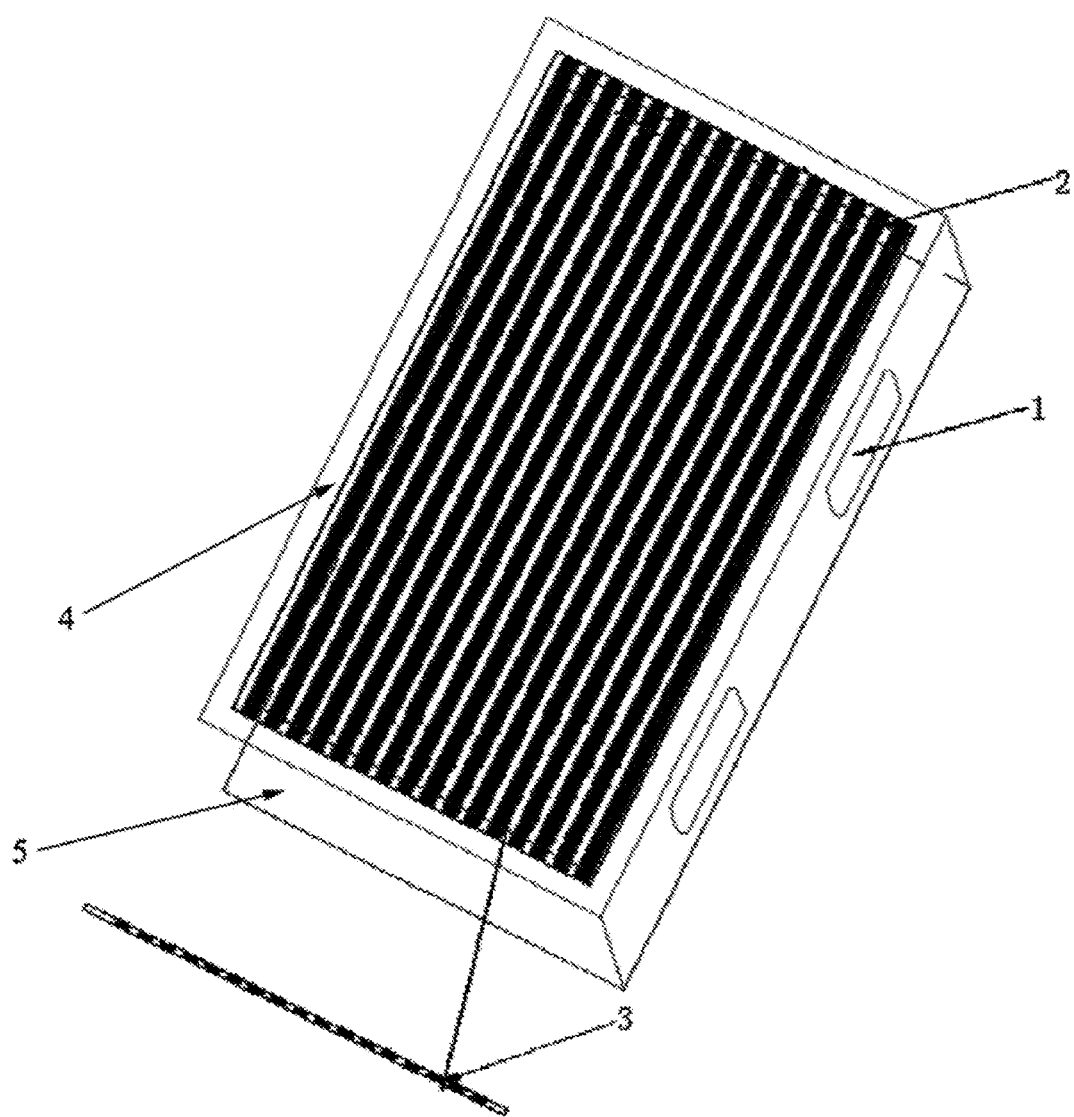
FIG. 2 is a structural representation of a mobile equipment protective sleeve according to Embodiment 2 of the invention.

FIG. 2 is a structural representation of a mobile equipment protective sleeve according to Embodiment 2 of the invention. In FIG. 2, 1 represents a restricting slot for assembling a display device, 2 represents a display region, 3 represents a slit grating in the display region, 4 represents a protective cover plate, and 5 represents a bottom plate.

Embodiment 3

1) 8 wt % silicon oxide, 6 wt % copper oxide, 36 wt % zirconium carbide, 5 wt % tungsten carbide, 37 wt % nano tourmaline, 2 wt % carbon nanotube and 6 wt % calcium oxide are mixed homogeneously and then crushed, thus an inorganic powder is obtained.

Then, ¼ of the total amount of azodiisovaleronitrile and ¼ of the total amount of 2,2-bis(3-amino-4-hydroxyphenyl) hexafluoropropane are dissolved in propylene glycol monomethyl ether acetate for standby use.

The inorganic powder is added into, for example, a four-necked flask and stirred, shocked and shaken; then, benzophenone dianhydride, the remaining propylene glycol monomethyl ether acetate, the remaining azodiisovaleronitrile and 2,2-bis(3-amino-4-hydroxyphenyl)hexafluoropropane are added and dissolved homogeneously, and the mol ratio of the dianhydride to the diamine is 1:1.

The above mixture is first heated at 60° C. for 40 min; then, it continues to be heated at 100° C. for 40 min, thus a functional material is obtained.

2) The above functional material is dissolved in ethyl acetate to prepare a solution with a mass concentration of 1 wt %.

3) A color masterbatch and a resin are homogeneously mixed and fused, then a protective sleeve shell is obtained by pressure moulding;

4) The solution containing the functional material is coated on the outer surface of the protective sleeve shell; and a mobile equipment protective sleeve set with a lenticular lens is obtained by printing on the display region of the protective cover plate of the protective sleeve shell.

The infrared ray emissivity of the functional material obtained is tested according to GB/T7287-2008 standard, and the number of negative ions generated is measured by a air negative ion counter. The test results shows that, the infrared ray emissivity of the protective sleeve is 90.6%, and the negative ion concentration is 2300 per cubic centimeter.

One embodiment of the invention further discloses a mobile equipment, which includes any one of the above mobile equipment protective sleeves. The mobile equipment may be a mobile phone, a computer and a TV set, etc.

The above embodiments are only illustrated for aiding the understanding of the method of the invention and its core concept. It should be pointed out that, for one of ordinary skills in the art, various improvements and modifications may be made to the invention without departing from the principles of the invention, and these improvements and modifications also fall into the protection scope of the claims of the invention.

With the above illustration of the embodiments disclosed, those skilled in the art can implement or utilize the invention. Various modifications to these embodiments are apparent to those skilled in the art, and the general principle defined herein may be realized in other embodiments without departing from the spirit or scope of the invention. Therefore, the invention will not be limited to the embodiments illustrated; instead, the invention conforms to the widest range consistent with the principles and novel features disclosed herein.

What is claimed is:

1. A mobile equipment protective sleeve, comprising: a bottom plate and a protective cover plate that is connected with and set opposite to the bottom plate, wherein a lenticular lens or a slit grating is located at a display region of the protective cover plate;
the mobile equipment protective sleeve is made of a resin composition containing a functional material, or a surface of the mobile equipment protective sleeve is coated with a functional material;
the functional material is an inorganic powder with an organic modification layer on a surface thereof;
the inorganic powder is one or more of boron oxide, sodium oxide, lithium oxide, aluminium oxide, zinc oxide, titanium oxide, silicon dioxide, silver complex, silver phosphate, silver nitrate, zirconium oxide, nano or sub-nano tourmaline, silver thiosulfate, carbon nanotube, aluminium sulphate, manganese and oxides thereof, iron and oxides thereof, cobalt and oxides thereof, nickel and oxides thereof, chromium and oxides thereof, copper and oxides thereof, magnesium oxide, boron carbide, silicon carbide, titanium carbide, zirconium carbide, tungsten carbide, tantalum carbide, molybdenum carbide, boron nitride, chromium nitride, titanium nitride, zirconium nitride, aluminium nitride, chromium boride, trichromium tetraboride, titanium boride, zirconium boride, tungsten disilicide and titanium disilicide; and
the modification layer is generated by reacting a dianhydride with a diamine.

2. The mobile equipment protective sleeve according to claim 1, wherein, the dianhydride of the modification layer is pyromellitic dianhydride, trimellitic anhydride, benzophenone dianhydride, biphenyl dianhydride, oxydiphthalic dianhydride or hexafluoro dianhydride;
the diamine of the modification layer is 3-aminobenzylamine, 2,2'-difluoro-4,4'-(9-fluorenylidene)diphenylamine, 2,2-bis(3-amino-4-hydroxyphenyl)hexafluoropropane, hexahydro-m-xylylenediamine, 1,4-bis (aminomethyl)cyclohexane, 2,2-bis[4-(4-aminophenoxy)benzene]hexafluoropropane, 2,2-bis(3-amino-4-tolyl)hexafluoropropane, 2,2-bis(3-aminophenyl)hexafluoropropane, 2,2-bis(4- aminophenyl)hexafluoropropane, 2,7-diaminofluorene, m-xylylenediamine or 4,4'-methylenebis(2-ethyl-6-methylaniline).

3. The mobile equipment protective sleeve according to claim 2, wherein the inorganic powder, the dianhydride, the diamine, an initiator and a solvent are mixed and heated so as to obtain the functional material.

4. The mobile equipment protective sleeve according to claim 3, wherein the inorganic powder, the dianhydride, the diamine, the initiator and the solvent are heated at 35-70° C. for 20-40 minutes, and then heated at 70-100° C. for 20-40 minutes.

5. The mobile equipment protective sleeve according to claim 1, wherein, the functional material is set on an inner surface or an outer surface of the lenticular lens or the slit grating.

6. The mobile equipment protective sleeve according to claim 5, wherein, the lenticular lens or the slit grating is located on an outer surface of the display region of the protective cover plate.

7. The mobile equipment protective sleeve according to claim 6, wherein, a convex face of the lenticular lens is set on a side that does not contact the protective cover plate.

8. The mobile equipment protective sleeve according to claim 7, wherein, a restricting slot is set at a joint between the protective cover plate and the bottom plate.

9. The mobile equipment protective sleeve according to claim 6, wherein, the display region of the protective cover plate is made of glass or optical plastics.

10. The mobile equipment protective sleeve according to claim 9, further comprising: a solar film set on an outer surface of the bottom plate.

11. A mobile equipment, which comprises the mobile equipment protective sleeve according to claim 1.

12. The mobile equipment according to claim 11, wherein, the dianhydride of the modification layer is pyromellitic dianhydride, trimellitic anhydride, benzophenone dianhydride, biphenyl dianhydride, oxydiphthalic dianhydride or hexafluoro dianhydride;

the diamine of the modification layer is 3-aminobenzylamine, 2,2'-difluoro-4,4'-(9-fluorenylidene)diphenylamine, 2,2-bis(3-amino-4-hydroxyphenyl)hexafluoropropane, hexahydro-m-xylylenediamine, 1,4-bis(aminomethyl)cyclohexane, 2,2-bis[4-(4-aminophenoxy)benzene]hexafluoropropane, 2,2-bis(3-amino-4-tolyl)hexafluoropropane, 2,2-bis(3-aminophenyl)hexafluoropropane, 2,2-bis(4-aminophenyl)hexafluoropropane, 2,7-diaminofluorene, m-xylylenediamine or 4,4'-methylenebis(2-ethyl-6-methylaniline).

13. The mobile equipment according to claim 12, wherein, the inorganic powder, the dianhydride, the diamine, an initiator and a solvent are mixed and heated so as to obtain the functional material.

14. The mobile equipment according to claim 13, wherein, the inorganic powder, the dianhydride, the diamine, the initiator and the solvent are heated at 35-70° C. for 20-40 minutes and then heated at 70-100° C. for 20-40 minutes.

15. The mobile equipment according to claim 11, wherein, the functional material is set on an inner surface or an outer surface of the lenticular lens or the slit grating.

16. The mobile equipment according to claim 15, wherein, the lenticular lens or the slit grating is located on an outer surface of the display region of the protective cover plate.

17. The mobile equipment according to claim 16, wherein, a convex face of the lenticular lens is set on a side that does not contact the protective cover plate.

18. The mobile equipment according to claim 17, wherein, a restricting slot is set at a joint between the protective cover plate and the bottom plate.

19. The mobile equipment according to claim 16, wherein, a display region of the protective cover plate is made of glass or optical plastics.

20. The mobile equipment according to claim 19, further comprising: a solar film set on an outer surface of the bottom plate.

* * * * *